April 4, 1950         G. N. HUGHES         2,502,848
MEASURING SYSTEM FOR DIRECT CURRENT POWER INCLUDING
AN ALTERNATING CURRENT WATT-HOUR METER
Filed April 26, 1945         3 Sheets-Sheet 1
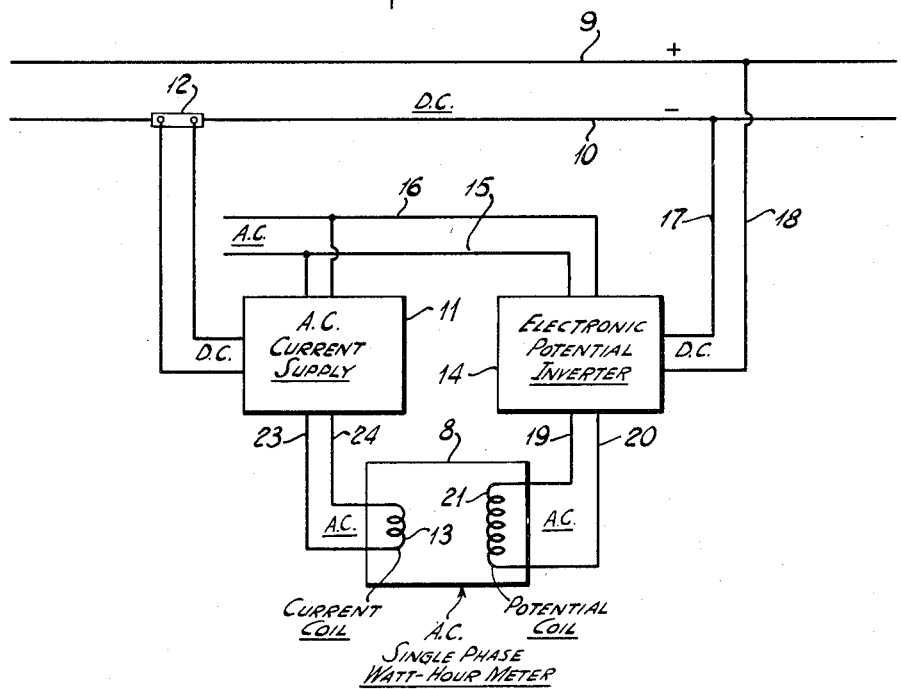
INVENTOR
GUY N. HUGHES.
BY
ATTORNEY

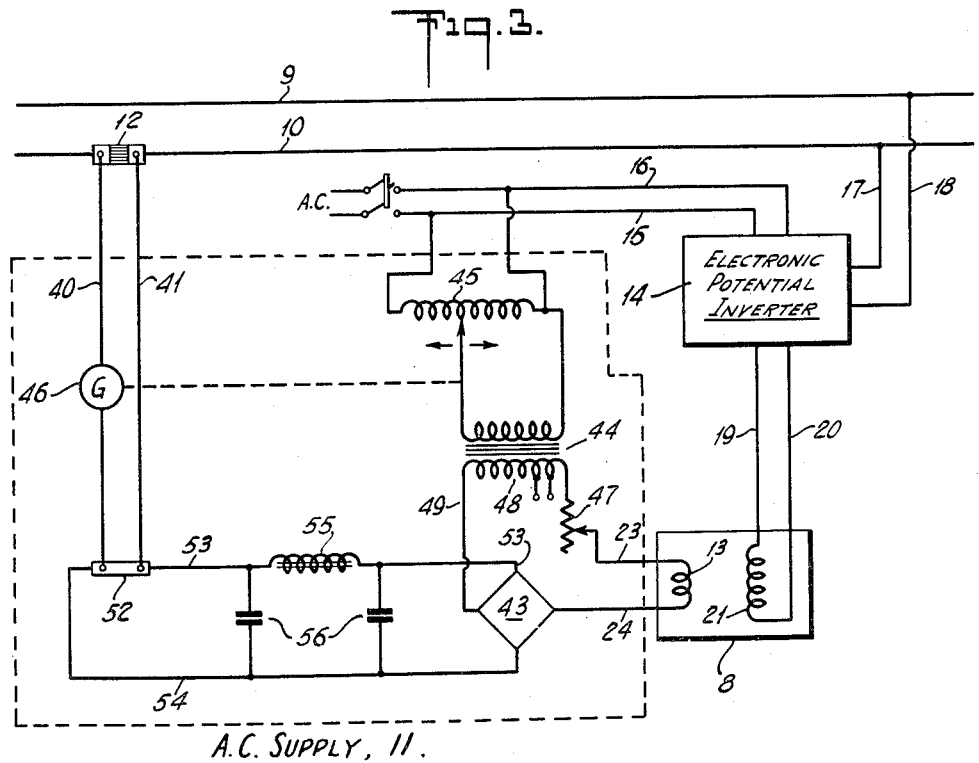
Fig. 3.
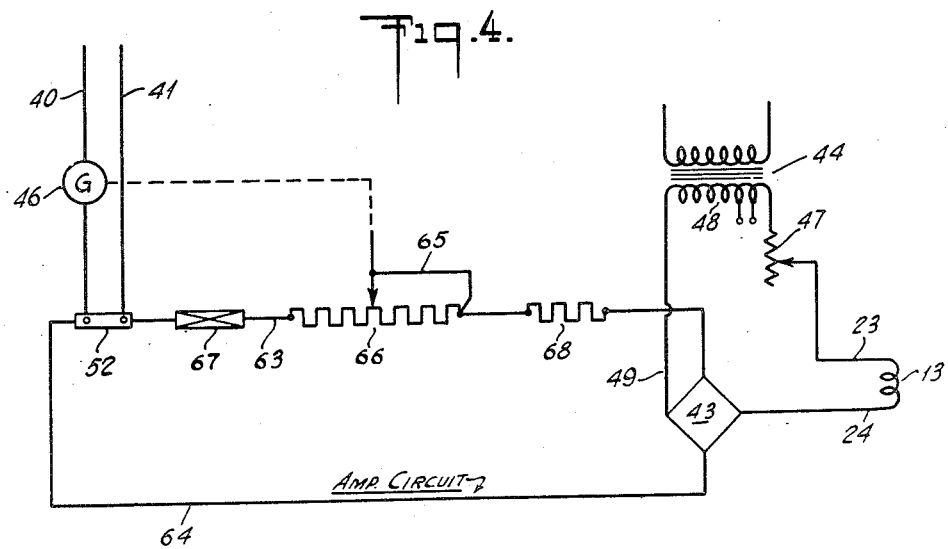
Fig. 4.
INVENTOR
GUY N. HUGHES.
BY
ATTORNEY Patented Apr. 4, 1950

2,502,848

UNITED STATES PATENT OFFICE 2,502,848

MEASURING SYSTEM FOR DIRECT CURRENT POWER, INCLUDING AN ALTERNATING CURRENT WATT-HOUR METER

Guy N. Hughes, Maryville, Tenn., assignor to Aluminum Company of America, Pittsburgh, Pa., a corporation of Pennsylvania Application April 26, 1945, Serial No. 590,464

7 Claims. (Cl. 171—34)

This invention relates to the measurement of direct current power and particularly to the recording of such power as by a watt-hour meter.

The object of the invention is to provide a system giving an accurate measurement of the D. C. power and adaptable to a wide range of power systems including those of high amperage.

Further objects of the invention, particularly in the combination of circuits whereby the D. C. voltage and current is measured by an alternating current watt-hour meter, will appear from the following specification taken in connection with the accompanying drawings in which, Fig. 1 is a diagram showing the elements of a measuring system of this invention;

Fig. 3 is a similar diagram showing in detail the circuit parts supplying the current windings of the meter; and Fig. 4 is a diagrammatic view similar to Fig. 3 and illustrating a modification.

Figure 2:
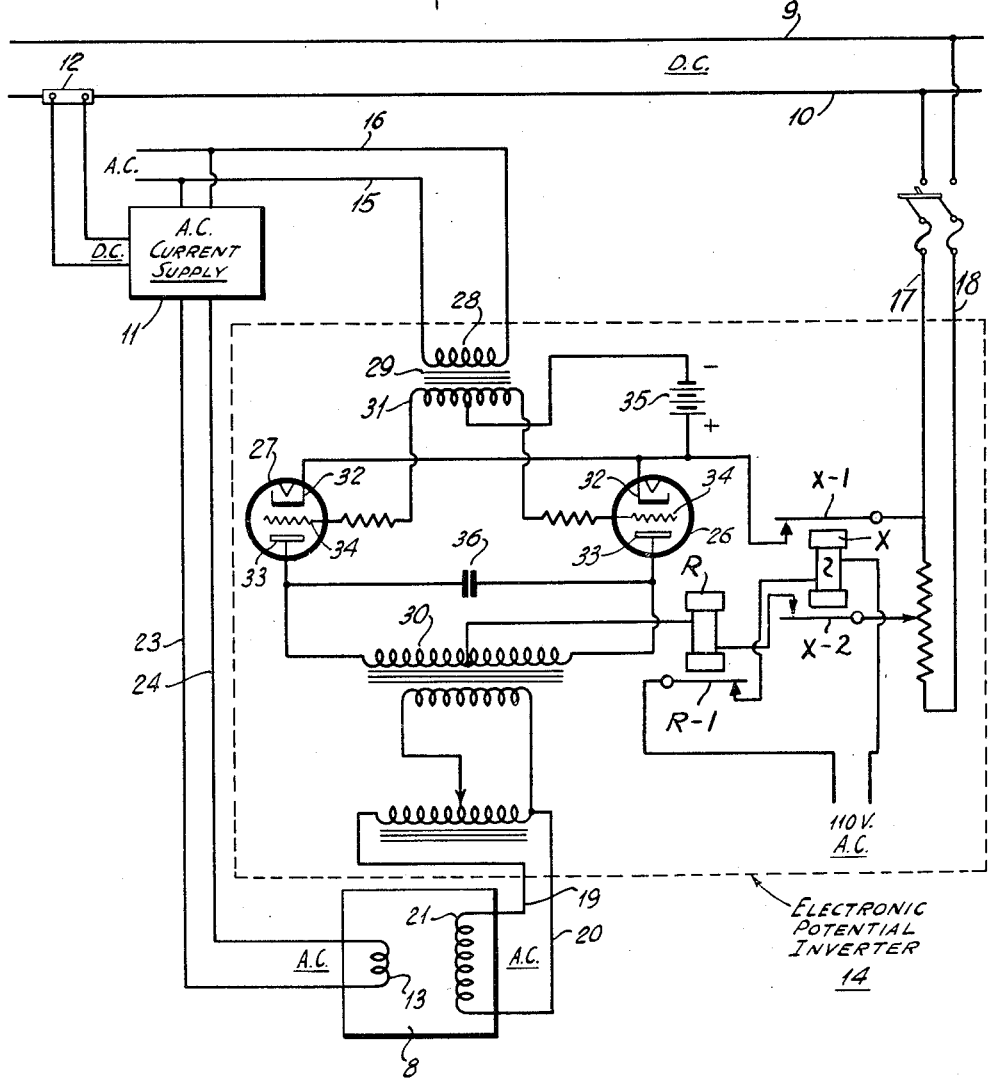
Fig. 2 is a similar diagram amplifying the showing of the inverter supplying the potential circuit of the meter.

As indicated in Fig. 1, the system employs a single phase A. C. integrating watt-hour meter 8 to measure the power flowing through the D. C. line 9, 10. This meter 8 is a single phase, induction type and the D. C. and voltage are converted into proportionate A. C. and voltage for operation of the meter.

To attain the accurate, proportionate transfer of the D. C. power characteristics to the meter 8, an A. C. supply 11 controlled by shunt 12 delivers proportionate alternating current from a suitable A. C. source, as indicated, through conductors 23, 24 to the current windings 13 of meter 8, and the A. C. source is linked by conductors 15, 16 to the electronic potential inverter 14 which receives its D. C. voltage through leads 17, 18 and inverts this to proportionate A. C. voltage delivered through circuit 19, 20 to the potential windings 21 of the meter.

This measurement of the D. C. power by the A. C. meter depends primarily on the production of an alternating voltage and an alternating current proportional to the D. C. line voltage and current of the power to be measured and upon control of the phase relation between them. It is desirable for the phase angle to be approximately zero and it should remain fixed.

The circuits for inversion of the D. C. potential to A. C. potential are illustrated in Fig. 2 in combination with the A. C. supply 11 to provide the A. C. voltage proportional to the D. C. line voltage and in phase with the A. C.

The inverter consists of two tubes 26, 27 of "Thyratron" type which are rendered alternately conductive and non-conductive by a trigger or actuating A. C. voltage with which the metering A. C. of supply 11 is in phase, this trigger voltage being applied through line 15, 16 to the primary 28 of transformer 29 and thence through the center-tapped secondary 31 to the tube grids 34. The current for these tubes 26, 27 is drawn alternately, in opposite directions, through the center-tapped transformer winding 30, producing a reversing flux in the transformer core and inducing an alternating voltage in the secondary winding. The two gas filled (or mercury vapor) tubes 26, 27 each have anode 32, cathode 33, and semi-controlling grid 34. In each tube after conduction has been established the grid 34 completely loses control of the tube and the voltage drop from cathode 33 to anode 32 is constant irrespective of current, this characteristic being vital to the proper operation of the inverter.

A trigger voltage is applied to the grids 34 of these two tubes in phase with the same source which supplies the metering current. Both grids are biased negatively and the trigger voltage from transformer 29 drives these grids 34 alternately in the positive and negative sense. For instance, after the tube 27 has fired (conduction established), the plate voltage of tube 27 may be, for example, approximately 15 volts and the remainder of the line potential (600 volts for example) appears as an impedance drop of 585 volts across the left half of the transformer 30. Tube 26 is non-conductive and its plate voltage is the full line or bus voltage 600.

As both tubes are normally biased negatively to some point safely beyond "cut-off," the trigger voltage from transformer 29 serves only alternately to increase and decrease this bias. During the half cycle in which the trigger voltage is increasing the bias of tube 27, it is decreasing the bias on tube 26 until tube 26 is permitted to fire. When tube 26 fires its plate voltage drops from around 600 to about 15 volts causing a negative surge through condenser 36, which in turn lowers the plate voltage of tube 27 to some negative value and consequently the arc in tube 27 is extinguished. By this time the grid of tube 27 has been driven sufficiently negative to regain control and tube 27 remains extinguished for a half cycle.

When tube 26 fired, it caused a voltage to appear across the right half of transformer 30 and at the same time the voltage across the left half disappeared because tube 27 was extinguished. In this manner an alternating voltage is induced in the secondary winding of transformer 30.

The voltage is proportional to the D. C. line voltage because the line voltage is applied directly to each half of the primary winding 30. This voltage will have a fixed phase relation to the metering current since the tubes 26, 27 are fired by the same voltage which produces the metering current.

Control relays R and X are provided for opening the tube circuit and for restarting commutation in case both tubes become ignited at the same time. Under normal conditions the current drawn by each tube is limited by the impedance of the transformer winding 30 but if both tubes 26, 27 become ignited at the same time the impedance drops to a value corresponding to the pure D. C. resistance of the transformer winding and the current would be excessive. Commutation (alternate ignition of the tubes) would be destroyed and could be reestablished only by de-energizing the tube circuit momentarily. To this end, the D. C. voltage is applied to the tube circuit through switch contacts X—1 and X—2 of relay or contactor X. One side of this tube circuit extends from the mid-tap of transformer 30 through the coil of overcurrent relay R to switch contacts X—2 of contactor X, and the other side of the tube circuit extends from anodes 32 of tubes 26 and 27 to switch contact X—1 of contactor X, as shown. The energizing circuit of the operating coil of contactor X extends from a suitable A. C. supply through normally closed contacts R—1 of relay R, whereby contactor X is normally energized to hold its switch contacts X—1 and X—2 closed and complete the tube circuit. The relay R operates under abnormal current flow in the tube circuit to open its contacts R—1 and effect de-energization of contactor X so as to open the tube circuit at the contacts X—1 and X—2. Current no longer can flow through tubes 26, 27 and consequently the abnormal current which caused relay R to operate disappears (both tubes 26, 27 becoming non-conducting) and the relay R becomes de-energized to re-establish the energizing circuit of contactor X which then operates to reclose its contacts X—1 and X—2 so that the tube circuit is again completed and the tubes may start firing again in alternation.

As diagrammed in Fig. 3 the A. C. supply for the meter is provided by a potentiometer type controller which is in effect a D. C. transformer delivering a low value external current which is at all times exactly proportional to the current in the main D. C. shunt 12. The low current external circuit is D. C. and comes from a dry type rectifier 43 receiving A. C. from transformer 44 and variable voltage supply 45 controlled by galvanometer 46 of the null type in the shunt circuit 12, 40, 41 from the main line. The current coil 13 of the meter 8 takes its A. C. from the A. C. side of the rectifier 43 through connections 23, 24, 47, 48, 49 so as to be in series with the secondary 48 of transformer 44. With the characteristics of the rectifier 43 constant the A. C. will be proportional to the D. C. of the rectifier which in turn is maintained proportional to the D. C. line current by the 1 ampere shunt 52 connected in series in shunt circuit 40, 41 in opposition to line shunt 12. The resultant of the voltages across shunts 12 and 52 determines the response of galvanometer 46 which controls the voltage of the primary of transformer 44 and in turn the A. C. voltage applied to the rectifier 43. This controller shunt 52 has its terminals connected to the D. C. side of the rectifier 43 by conductors 53, 54 which may be provided with series inductance 55 and spanned by condensers 56 for the purpose of smoothing the D. C. from the rectifier 43.

The continuously variable transformer 45 supplies A. C. to the meter current coil 13 and the plate type bridge rectifier 43 by which it is rectified into D. C., the A. C. being thus proportional to the D. C., except for negligible losses in the rectifier, and, therefore, also proportional to the current in the main line bus 9, 10.

Fig. 4 shows a modified circuit for the current supply to the meter in which the regulation is done on the D. C. side of the rectifier, and the slide wire 65 controlled from galvanometer 46 is connected on the potentiometer principle. The wires 63, 64 connect the shunt 52 to the D. C. terminals of the rectifier 43 and in series in the circuit are the fixed resistance 67, adjustable resistance 68 and the resistance 66 variable by slide wire 65.

In this system, the current and voltage supplied to the watt-hour meter are drawn from the D. C. line and maintained in proportion to the corresponding line characteristics, while at the same time the phase relation of the current and voltage supplied to the watt-hour meter are kept in constant phase relation as by control from a single A. C. source. This brings the current and voltage of the single phase A. C. watt-hour meter into direct proportionate relation to the current and voltage of the D. C. line and at the same time gives a unitary control of the phase relation between the watt-hour meter current and voltage.

The result is a very accurate reflection at each instant of the D. C. line performance translating its current and voltage into the corresponding A. C. and voltage of the A. C. watt-hour meter. In this way, an accurate record of the power delivered by the D. C. is attained and the difficulties attendant upon the use of D. C. watt-hour meters are avoided. The system is simple in its circuits and self-maintaining and gives a very precise, accurate and satisfactory record of large power consumption such, for instance, as a 50,000 ampere D. C. supply line involving a fairly steady load of substantially constant voltage.

I claim:

1. A system for measuring the power delivered by a D. C. line comprising an A. C. induction watt-hour meter, an electronic inverter supplying alternating voltage to the potential coil of said meter proportional to the voltage of the D. C. line, a transformer for supplying alternating current to the current coil of said meter, a shunt in said D. C. line, means dependent on the current output of said shunt for rendering the current delivered by said transformer proportional to that in said D. C. line, and an external A. C. supply for energizing said transformer and controlling the operation of said inverter.

2. A system for measuring the power delivered by a D. C. line comprising an A. C. induction watt-hour meter, an electronic inverter supplying alternating voltage to the potential coil of said meter proportional to the voltage of said D. C. line, a transformer for supplying alternating current to the current coil of said meter, a rectifier connected in series with the current coil of said meter and providing a direct current output proportional to the alternating current delivered to said current coil, a shunt circuit including a main line shunt and a control shunt, said control shunt being energized by the D. C. output of said rectifier in opposition to the current delivered by said main line shunt, means responsive to the opposed output of said shunts for varying the current supplied to the meter to establish a proportional relationship between the current in the D. C. line and the current in said current coil, and a common external A. C. supply for energizing said transformer and controlling the operation of said inverter.

3. A system for measuring the power delivered by a D. C. line comprising an A. C. induction watt-hour meter, an electronic inverter supplying alternating voltage to the potential coil of said meter proportional to the voltage of the said D. C. line, a transformer for supplying alternating current to the current coil of said meter, a rectifier connected in a series with the current coil of said meter and providing a direct current output proportional to the alternating current delivered to said current coil, a shunt circuit including a main line shunt and a control shunt, said control shunt being energized by the D. C. output of said rectifier in opposition to the current delivered by said main line shunt, a galvanometer means responsive to difference between the outputs of said shunts for controlling the output of said transformer whereby the current in said current coil is maintained proportional to that in said D. C. line, and a common external A. C. supply for energizing said transformer and controlling the operation of said inverter.

4. A system for measuring the power delivered by a D. C. line comprising an A. C. induction watt-hour meter, an electronic inverter supplying alternating voltage to the potential coil of said meter proportional to the voltage of the D. C. line, said inverter including a pair of parallel connected electronic tubes alternately operable for effecting derivation of said alternating voltage, a transformer for supplying alternating current to the current coil of said meter, a shunt in said D. C. line, means dependent on the current output of said shunt for rendering the current delivered by said transformer proportional to that in said D. C. line, and an external A. C. supply for energizing said transformer and controlling the operation of said inverter.

5. A system for measuring the power delivered by a D. C. line comprising an A. C. induction watt-hour meter, an electronic inverter supplying alternating voltage to the potential coil of said meter proportional to the voltage of the D. C. line, said inverter including a pair of parallel connected electronic tubes alternately operable for effecting derivation of said alternating voltage, an overload relay switch in series circuit relation with both of said tubes, a contactor for opening and closing the circuit to said tubes, a circuit controlled by said overload relay switch for effecting energization of said contactor to close the circuit to said tubes, said contactor being de-energized and opening said tube circuit in response to excessive current flow in said overload relay and being re-energized and re-closing said tube circuit upon cessation of current flow in said overload relay switch, a transformer for supplying alternating current to the current coil of said meter, a shunt in said D. C. line, means dependent on the current output of said shunt for rendering the current delivered by said transformer proportional to that in said D. C. line, and an external A. C. supply for energizing said transformer and controlling the operation of said inverter.

6. A system for measuring the power delivered by a D. C. line comprising an A. C. induction watt-hour meter, an electronic inverter supplying alternating voltage to the potential coil of said meter proportional to the voltage of the D. C. line, said inverter including a pair of parallel connected electronic tubes alternately operable for effecting derivation of said alternating voltage, an overload relay switch in series circuit relation with both of said tubes, a contactor for opening and closing the circuit to said tubes, a circuit controlled by said overload relay switch for effecting energization of said contactor to close the circuit to said tubes, said contactor being de-energized and opening said tube circuit in response to excessive current flow in said overload relay and being re-energized and re-closing said tube circuit upon cessation of current flow in said overload relay switch, a variable voltage transformer for supplying alternating current to the current coil of said meter, a dry type bridge rectifier connected in a series with the current coil of said meter and providing a direct current output proportional to that current delivered to said current coil, a shunt circuit including a main line shunt and a control shunt, said control shunt being energized by the D. C. output of said rectifier in opposition to the current delivered by said main line shunt, a galvanometer means responsive to difference between the outputs of said shunts for adjusting said transformer to control the current output thereof whereby the current in said current coil is maintained proportional to that in said D. C. line, and a common external A. C. supply for energizing said transformer and controlling the operation of said inverter.

7. A system for measuring the power delivered by a D. C. line comprising an A. C. induction watt-hour meter, an electronic inverter supplying alternating voltage to the potential coil of said meter proportional to the voltage of the D. C. line, said inverter including a pair of parallel connected electronic tubes alternately operable for effecting derivation of said alternating voltage, an overload relay switch in series circuit relation with both of said tubes, a contactor for opening and closing the circuit to said tubes, a circuit controlled by said overload relay switch for effecting energization of said contactor to close the circuit to said tubes, said contactor being de-energized and opening said tube circuit in response to excessive current flow in said overload relay and being re-energized and re-closing said tube circuit upon cessation of current flow in said overload relay switch, a variable voltage transformer for supplying alternating current to the current coil of said meter, a dry type bridge rectifier connected in a series with the current coil of said meter and providing a direct current output proportional to the current delivered to said current coil, a shunt circuit including a main line shunt and a control shunt, said control shunt being energized by the D. C. output of said rectifier in opposition to the current delivered by said main line shunt, an adjustable resistance connected in series with said control shunt and the D. C. side of said rectifier, a galvanometer means responsive to difference between the outputs of said shunts for adjusting said resistance to control the current in said D. C. circuit of the rectifier whereby the current in said current coil is maintained proportional to that in said D. C. line, and a common external A. C. supply for energizing said transformer and controlling the operation of said inverter.

GUY N. HUGHES.

REFERENCES CITED

The following references are of record in the file of this patent:

UNITED STATES PATENTS

| Number | Name | Date |
| --- | --- | --- |
| 1,732,823 | West | Oct. 22, 1929 |
| 1,808,334 | Angus | June 2, 1931 |
| 1,825,514 | Fitzgerald | Sept. 29, 1931 |
| 1,961,823 | Garton | June 5, 1934 |
| 2,153,378 | Kramer | Apr. 4, 1939 |
| 2,203,663 | Bennett | June 11, 1940 |
| 2,217,435 | Edler | Oct. 8, 1940 |
| 2,338,118 | Klemperer | Jan. 4, 1944 |
| 2,338,423 | Geyger | Jan. 4, 1944 |